United States Patent [19]

Stalley et al.

[11] 3,978,519
[45] Aug. 31, 1976

[54] DIGITAL TIME BASE CORRECTORS FOR TELEVISION EQUIPMENT

[75] Inventors: Anthony Donald Stalley; John Albert Coffey, both of Newbury, England

[73] Assignee: Quantel Limited, England

[22] Filed: Mar. 13, 1975

[21] Appl. No.: 558,091

[30] Foreign Application Priority Data
Mar. 16, 1974 United Kingdom............... 11794/74

[52] U.S. Cl..................................... 358/8; 360/36; 331/20
[51] Int. Cl.²....................... H04N 5/76; H04N 9/46
[58] Field of Search........................ 358/4, 8, 19–21; 178/DIG. 3, 695 TV, 6.6 TC; 331/20; 360/36

[56] References Cited
UNITED STATES PATENTS

| | | |
|---|---|---|
| 3,428,745 | 2/1969 | Coleman, Jr. et al. ................. 358/8 |
| 3,507,983 | 4/1970 | Leman.................................... 358/8 |
| 3,733,432 | 5/1973 | Arimura et al. ......................... 358/8 |
| 3,749,836 | 7/1973 | Hayami et al. .............. 178/69.5 TV |
| 3,752,912 | 8/1973 | Ohsawa et al. ................ 178/DIG. 3 |
| 3,763,317 | 10/1973 | Coleman, Jr. et al. ................. 358/8 |
| 3,860,952 | 1/1975 | Tallent et al............................ 358/8 |

*Primary Examiner*—Robert L. Griffin
*Assistant Examiner*—Jin F. Ng
*Attorney, Agent, or Firm*—Dowell & Dowell

[57] ABSTRACT

The television digital time base corrector comprises an analogue to digital converter for receiving a video analogue signal, a store for receiving the successive line information in digital form from the output of the analogue to digital converter, a digital to analogue converter for receiving the stored signal, a read/write control circuit for writing the digital information into said store, an input oscillator for determining the rate of conversion of the analogue signal and the rate of writing the store, and an output oscillator for controlling the rate of reading out of the digital information from the store and the rate of conversion of the digital information in the store. The input oscillator is in the form of a triggered oscillator which is switched on and off in timed relationship with the video sync pulse and/or sub-carrier color burst. The oscillator thus commences its pulse generation at a time which is directly related to the timing of the sync pulse.

The oscillator is of a fixed frequency and produces a series of pulses sufficient to allow all the incoming video information in one line to be converted and then stops oscillating. The oscillator is retriggered by the next start pulse derived from the incoming sync pulse information.

10 Claims, 7 Drawing Figures

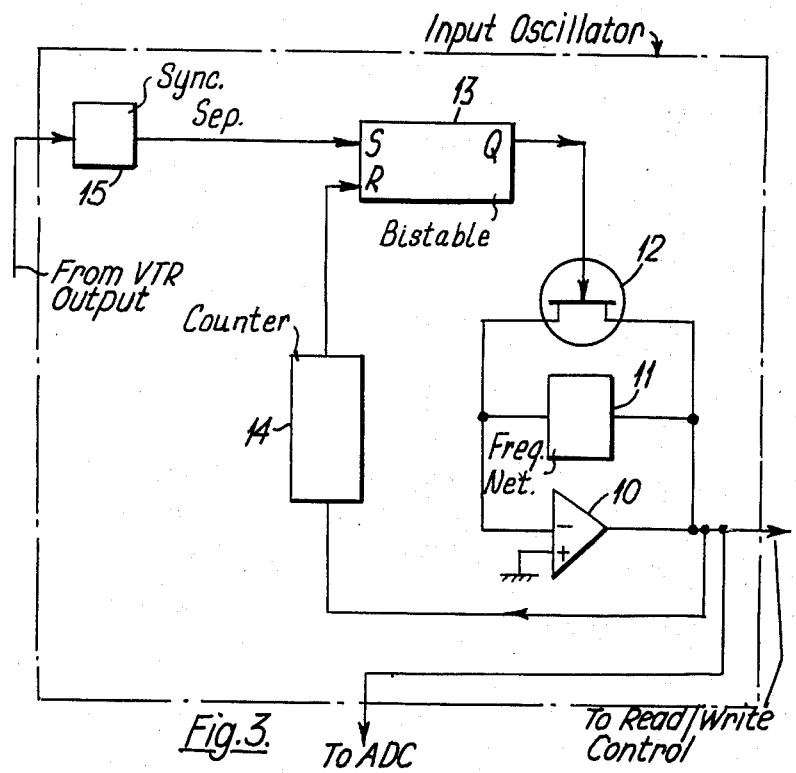
Fig. 3. To ADC    To Read/Write Control
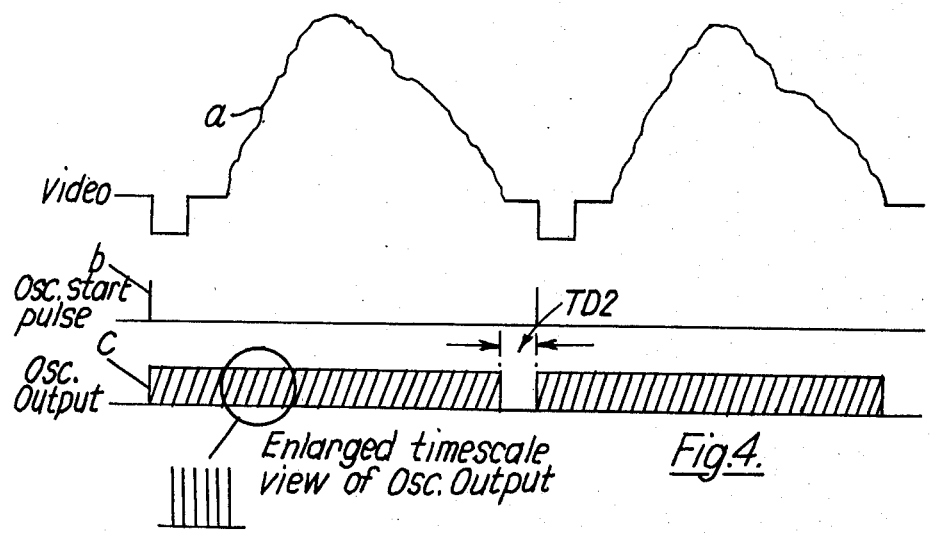
Fig. 4.

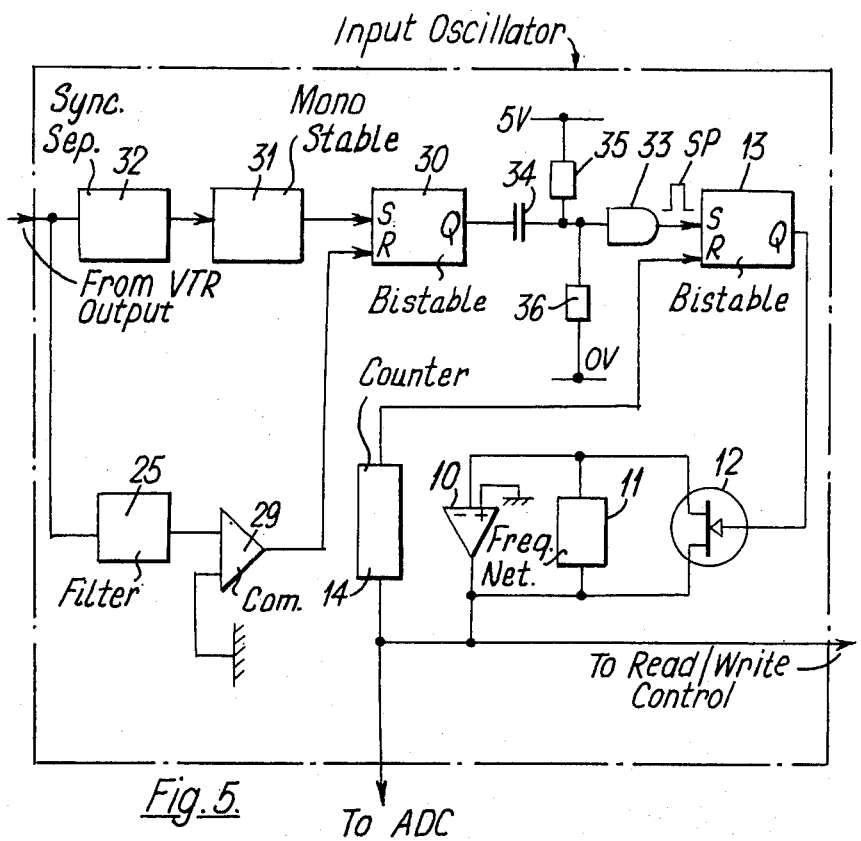
Fig. 5.
Burst Input to Filter 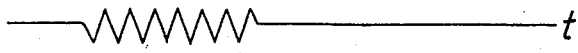 t
Burst Output from Filter 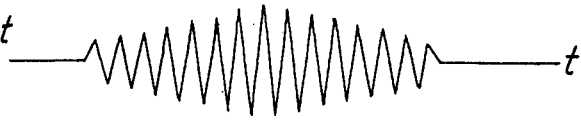 t
Fig. 6.

DIGITAL TIME BASE CORRECTORS FOR TELEVISION EQUIPMENT

BACKGROUND TO THE INVENTION

This invention relates to a digital time base corrector. The purpose of this equipment is to accept the output from a video tape recorder (VTR) and to correct for errors in timing of the output signal with reference to a stable synchronizing signal.

The incoming video signal is converted into a digital format by analogue to digital converter (ADC). The digital output from the ADC is stored in a store which will conveniently have a capacity sufficient to store one or more complete television line. the output from the store is converted into an analogue video signal by a digital to analogue converter (DAC).

The incoming video signal will be converted into a digital format at a clock rate determined by the input oscillator. The input oscillator will be caused to follow the timing perturbations of the output signal of the VTR. Such perturbations are caused by changes in the velocity of the tape transport and the scanning mechanism of the VTR.

The information read from the store into the DAC is under the control of an output oscillator which is generally locked to a local synchronizing signal.

The principle of the operation is that the information is written into the store at a speed which depends upon the perturbations on the output from the VTR but that the information is read out of the store at a constant rate. Thus the equipment eliminates time perturbations occurring on a video signal.

This particular invention relates to the improvements in the input oscillator which may be made in such a system. Generally the above configuration is known and recognised by engineers versed in the art of television systems. The improvements relate in particular to the method by which the input oscillator is caused to follow the perturbations on the video tape recorder output.

In a known configuration an oscillaor designed to track the information coming from the video tape recorder may take the form of a phase locked loop (PLL). The information coming from the video tape recorder contains synchronizing pulse information and colour sub-carrier information which corresponds to the standard television format. At the beginning of each line a synchronizing pulse is provided so that the commencement of the line is accurately known.

when the format is associated with a colour television system such as the PAL or NTSC systems, a colour sub-carrier burst is provided in addition to the synchronizing pulse.

The burst is typically ten cycles at colour sub-carrier frequency. This burst of sub-carrier occurring just after the synchronizing pulse on each television line is an indication of the reference phase which allows the colour information contained in the following picture period of the video waveform to be accurately decoded into its component parts.

A conventional input oscillator system for the digital time base corrector needs to provide a source of clock pulses capable of driving the ADC and store at a rate which is derived from the frequency of the synchronizing pulses and colour sub-carrier information. During the course of one television line a digital time base corrector may take several hundred samples along the line. The method by which these sampling pulses may be generated is in a phase locked loop.

A voltage controlled oscillator (VCO) running at a suitable sampling frequency produces an output which is used to drive the ADC. The output is also applied to a system of multipliers and dividers which reduces the frequency to precisely that of the television line frequency. The output of the system is applied to one input of a phase discriminator which has its other input coming from the separated line synchronizing pulses from the VTR.

The phase discriminator will produce a variable voltage at its output which is so arranged to control the frequency of the voltage controlled oscillator in a manner which will cause the phase error at the two inputs to the discriminator to be close to zero.

The above system is known and recognised by users of digital television equipment and represents only a description of one method currently being used. The disadvantage of such known equipment is that the instantaneous frequency of the VCO is a function of the output of the phase discriminator over several preceding lines. Therefore when a phase error between the off-tape signal and the VCO occurs there is a finite response time before the error can be reduced to zero. For some types of off-tape timing perturbations it is impossible to design a phase locked loop which satisfactorily tracks the off-tape signal (that is to a close enough timing accuracy).

SUMMARY OF THE INVENTION

According to the present invention we provide a digital time base corrector for television equipment comprising an analogue to digital converter for receiving a video analogue signal, a store for receiving the successive line information in digital form from the output of the analogue to digital converter, a digital to analogue converter for receiving the stored signal, means for writing the digital information into said store, an input oscillator for determining the rate of conversion of said analogue signal and the rate of writing into said store, and an output oscillator for controlling the rate of reading out of the digital information from said store and the rate of conversion of the digital information in said store, said input oscillator being in the form of a triggered oscillator which is switched on and off in timed relationship with the video sync pulse and/or sub-carrier colour burst.

In effect, the phase locked loop of the known arrangement is replaced by a triggered oscillator. The output frequency of the oscillator is fixed by components within its circuit such as a crystal or a resonant circuit, or a delay line.

The oscillator is caused to trigger into its natural operating frequency at the beginning of each television line by a signal which is derived from the synchronizing pulse information and/or the colour sub-carrier burst information. As described below, triggering is controlled by the synchronizing pulse information alone in one example or by both the synchronizing pulse information and the colour burst information in the other example. The oscillator thus commences its pulse generation at a time which is directly related to the timing of the synchronizing pulse or colour burst information coming from the VTR. The oscillator produces a train of pulses sufficient to cause all the video information in one active line period to be converted by the ADC and stored and then stops awaiting the arrival of the next start pulse.

BRIEF DESCRIPTION OF DRAWINGS

In the accompanying drawings:

FIG. 3 shows one example of a triggered oscillator for use in the circuit of FIG. 1 and serving to modify the time base corrector in accordance with the present invention, FIG. 4 shows the waveforms of the video input signal, oscillator start pulse, and oscillator output pulses relating to the oscillator of FIG. 3, FIG. 5 shows a further example of a triggered oscillator using an alternative arrangement for providing oscillator start pulses, FIG. 6 shows waveforms of the colour burst and the filtered colour burst.

Figure 1:
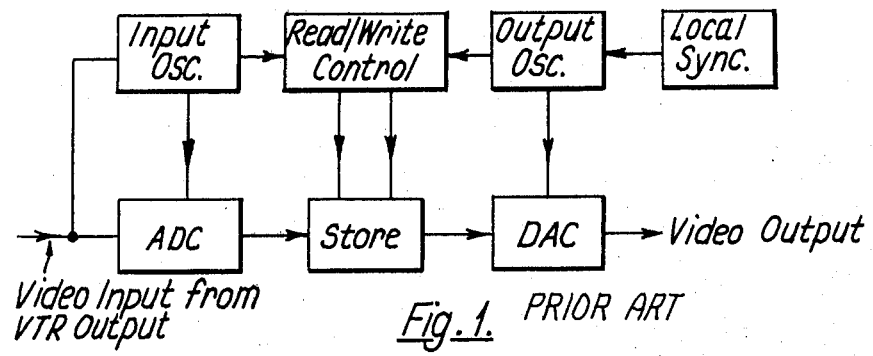
FIG. 1 is a block circuit diagram of the known digital time base corrector.
Figure 2:
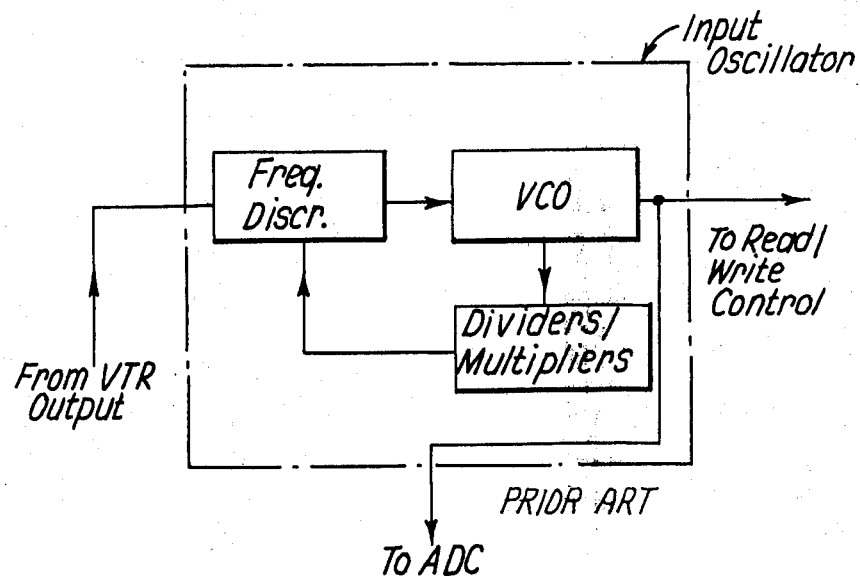
FIG. 2 shows a known input oscillator using the phase locked loop system.

The general arrangement of the digital time base corrector common to the known system and the present invention is shown in FIG. 1. The input oscillator used in the known corrector is shown in FIG. 2 and consists of the phase locked loop comprising the voltage controlled oscillator and the frequency discriminator referred to above.

DESCRIPTION OF THE PREFERRED EMBODIMENTS

One form of circuit for carrying out the invention is shown in FIG. 3. The system uses the synchronizing pulses only. An oscillator comprising an inverting amplifier 10 and a frequency determining network 11 are arranged in a feed back circuit to oscillate at the desired frequency. A switch shown as an FET switch 12 is connected across the network so that when it is closed the oscillator cannot operate. The switch 12 is driven from the output of a bistable 13. The bistable output is arranged such that when its output is high the switch is closed, and when its output is low the switch is open. Conventional logic circuits may be used to operate the switch.

The bistable 13 is arranged to be triggered to the low condition at its output when it receives the leading edge of the synchronizing pulse. The synchronizing pulse separator 15 derives the leading edge of the synchronizing pulse to set the bistable into its low state.

As soon as the switch 12 is opened the oscillator commences and runs at its predetermined frequency producing pulses which are fed into a counter 14. The counter is arranged to produce an output at a predetermined count which is used to reset the bistable and to reclose the switch thus stopping the oscillator.

In a typical system the counter will be set to count 500 or more pulses.

FIG. 4 shows a simplified video waveform (a) for one line. An oscillator start pulse (b) is derived at the front edge of each synchronizing pulse. The train of pulses (c) produced by the oscillator at the desired frequency commence upon the receipt of the oscillator start pulse (b) and terminate after a given number of pulses determined by the counter.

The accuracy of the oscillator starting point is determined by the ability of the sync pulse separator 15 to extract the information from the synchronizing pulse available at its input. Synchronizing pulse separators are well established and known to the engineers operating in television systems. Any suitable synchronizing pulse separator circuit may be used to derive the oscillator start pulse.

The simplified system described above provides timing information which depends upon the synchronizing pulse edge. Using the information contained within the colour burst, it is possible to improve the accuracy of the moment at which the oscillator is started.

The colour sub-carrier burst contains approximately ten cycles. The requirement of the system is to detect a zero crossing of the colour sub-carrier burst accurately in the presence of noise on the signal. In order to meet this particular requirement it is necessary to average the zero crossings which occur throughout the colour sub-carrier burst. By taking the average of the zero crossings, it becomes possible to obtain a more accurate reference for the oscillator start pulse.

In this further example, the colour sub-carrier burst is separated from the video signal and applied to a band pass filter with a limited bandwidth of approximately 0.5 MHz.

The action of the filter with a limited pass band is to reduce noise contained within the colour sub-carrier information and to average the phase of each cycle comprising the burst up to the time that the chosen zero crossing is detected.

The operation of the filter has therefore removed some of the noise present on the sub-carrier and the equipment may now use a zero crossing at the output of the filter to determine more accurately the timing of the oscillator start pulse. A comparator circuit is arranged to look for a zero crossing towards the middle of the filtered burst and uses this in conjunction with the normal synchronizing pulse information to cause an oscillator start pulse to occur.

The circuit shown in FIG. 5 is a simplified circuit which will achieve the required operation. The video input is filtered by a band filter 25. The burst applied to the filter is modified at its output to the form shown in FIG. 6.

Figure 7:
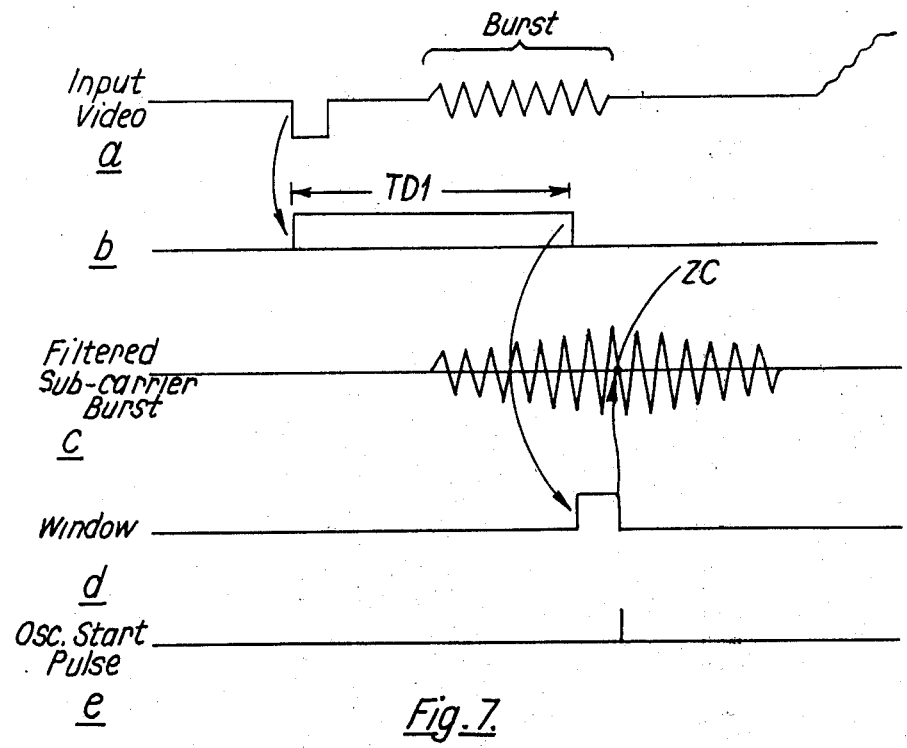
FIG. 7 shows a simplified timing diagram of the operation of the arrangement shown in FIG. 5.

A comparator circuit 29 compares the filtered sub-carrier burst with a known reference signal such as zero volts and produces at its output a square wave corresponding to the burst information occurring at the selected zero crossing following the maximum amplitude of the modified burst signal (see FIG. 7 waveform c). The output of the comparator 29 is coupled with one input R of a bistable 30. The other input S of bistable 30 receives a delayed pulse from a monostable circuit 31 and a sync pulse separator 32.

The incoming video synchronizing pulse is separated by the sync pulse separator 32 and delayed for a period TD1 by monostable 31. The delayed signal delays the setting of a bistable 30 until towards the end of the colour sub-carrier burst.

The oscillator start pulse SP is derived from an inverter 33 which is AC coupled via a differentiating circuit comprising capacitor 34 and resistors 35 and 36 connected to +5v and +0v levels respectively to the output Q of window bistable 30. The invertor is so arranged that when the output of the window bistable goes negative the oscillator start pulse is derived.

FIG. 7 shows a timing diagram related to the circuit of FIG. 5. Curve (a) represents a portion of the video signal, and curve b) represents a synchronizing pulse separated and delayed (TD1). Curve (c) is a filtered sub-carrier burst substantially coinciding with the end of the delayed signal TD1. Curve (d) represents the state of the bistable window 30 the length of the opening of which is defined by the end of the delayed sync pulse and the zero crossing point (zc). The waveform (e) shows the oscillator start pulse at the output of the inverter 33.

The negative edge of the time delay pulse from the monostable TD1 is caused to set the window bistable 30 so that it may now be reset by the pulse from the comparator derived from the next zero crossing of the colour burst. The negative transition of the comparator output will cause the window bistable to be reset and hence produce an oscillator start pulse. The oscillator may comprise switch 12, frequency determining network 11 and inverting amplifier 10 as shown in FIG. 3, the termination of the oscillator being controlled by the counter 14. The switching off of the oscillator is effected as described in relation to the FIG. 3 arrangement.

We claim:

1. A digital time base corrector for television equipment comprising:
   a. an analogue to digital converter for receiving successive lines of an analogue video signal having horizontal sync pulse information thereon and for converting said signal into digital form;
   b. a store for receiving the video information in digital form from the output of the analogue to digital converter;
   c. control means for writing in and reading out the digital information in said store;
   d. a digital to analogue converter for receiving the signal read out from said store;
   e. a fixed frequency input oscillator for determining the rate of conversion of said analogue signal into digital form and the rate of writing in of said digital information into said store;
   f. a fixed frequency output oscillator for determining the rate of reading out of the digital information from said store, and the rate of conversion of the digital information into analogue form; and
   g. said input oscillator including a triggered oscillator having an input connected to said incoming video signal which oscillator is triggered into oscillation in timed relationship with the incoming horizontal sync pulse information, said input oscillator including means connected to the output of the triggered oscillator to switch off said oscillator after emission of a predetermined number of oscillations therefrom which are sufficient to cause all the video information in one line to be converted into digital form and stored.

2. A digital time base corrector according to claim 1, wherein detector means are provided at the input to said triggered oscillator to detect an incoming horizontal sync pulse and to produce a start pulse thereby triggering said triggered oscillator into oscillation at the beginning of each television line.

3. A digital time base corrector according to claim 2, wherein said means for detecting said incoming sync pulse information comprises a sync pulse separator.

4. a digital time base corrector according to claim 2, wherein said means for switching off the triggered oscillator comprises a counter having an input connected to the output of said oscillator, said counter emitting a stop pulse after receiving said predetermined number of oscillations to switch off said triggered oscillator.

5. A digital time base corrector according to claim 4, wherein the triggered oscillator is switched on and off by means of a transistor coupled to the output of a bistable logic element, the latter having two inputs, one coupled to the output of the detector means to receive said start pulse and the other input being coupled to said counter to receive said stop pulse.

6. A digital time base corrector according to claim 2, wherein further detector means are provided at the input of said triggered oscillator to generate a signal from colour burst information contained on said incoming video signal, the two signals derived from the sync pulse and the colour burst detectors effecting triggering of the triggered oscillator.

7. A digital time base corrector according to claim 6, wherein said means for detecting the colour burst information comprises a narrow pass band filter for reducing noise present on the sub-carrier colour burst together with a comparator for detecting a zero crossing at the output of the filter.

8. A digital time base corrector according to claim 6, wherein delay means for receiving and delaying the signal derived from the sync pulse detector are provided together with a bistable element settable at one input by the delayed signal and resettable at another input by the signal from the colour burst detector, said bistable effecting triggering of the triggered oscillator by a change of state at its output.

9. A digital time base corrector according to claim 8, wherein a differentiator is coupled between the bistable element and the triggered oscillator.

10. A digital time base corrector according to claim 8, wherein said triggered oscillator includes a feedback amplifier and frequency determining network.

* * * * *